(12) United States Patent
Tate (10) Patent No.: US 8,210,596 B2
(45) Date of Patent: Jul. 3, 2012

(54) VEHICLE DOOR WITH DOOR BEAM

(75) Inventor: Kenta Tate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 521 days.

(21) Appl. No.: 12/177,313

(22) Filed: Jul. 22, 2008

(65) Prior Publication Data

US 2009/0026795 A1 Jan. 29, 2009

(30) Foreign Application Priority Data

Jul. 24, 2007 (JP) .................................. 2007-191731

(51) Int. Cl.
*B60J 5/04* (2006.01)
*B60J 5/00* (2006.01)
(52) U.S. Cl. ................................ 296/146.6; 296/187.12
(58) Field of Classification Search ............... 296/146.6, 296/187.12, 187.03, 1.03, 193.05
See application file for complete search history.

(56) References Cited

U.S. PATENT DOCUMENTS

| | | | | |
|---|---|---|---|---|
| 5,088,176 A | * | 2/1992 | Koga | 29/430 |
| 5,544,930 A | * | 8/1996 | Stedman | 296/146.6 |
| 6,135,541 A | * | 10/2000 | Geise et al. | 296/1.03 |
| 6,666,500 B2 | * | 12/2003 | Polzer et al. | 296/187.12 |
| 7,093,886 B2 | * | 8/2006 | Blust et al. | 296/146.6 |
| 7,401,847 B2 | * | 7/2008 | Kidachi et al. | 296/187.12 |

FOREIGN PATENT DOCUMENTS

| | | |
|---|---|---|
| JP | 06-000847 | 1/1994 |
| JP | 2001-322435 | 11/2001 |
| JP | 2005-225350 | 8/2005 |
| JP | 2006-315497 | 11/2006 |

* cited by examiner

*Primary Examiner* — Glenn Dayoan
*Assistant Examiner* — Melissa A Black
(74) *Attorney, Agent, or Firm* — Rankin, Hill & Clark LLP (57) ABSTRACT

A bracket is fixed to a door beam which is fixed to an inner panel between the inner panel and an outer panel of the door. The bracket extends from the door beam toward the outer panel and includes at an end thereof a curved part protruding toward the outer panel. The bracket is connected at the end thereof to the outer panel through the vibration damping member. The bracket has a predetermined length and is fixed to the inner panel at an angle between the inner panel reference plane and the extending direction. The angle is determined on the basis of a distance between the door beam and the outer panel.

8 Claims, 6 Drawing Sheets

VEHICLE DOOR WITH DOOR BEAM

CROSS REFERENCE TO RELATED APPLICATIONS

This application claims the foreign priority benefit under Title 35, United States Code, §119(a)-(d) of Japanese Patent Application No. 2007-191731, filed on Jul. 24, 2007 in the Japan Patent Office, the disclosure of which is herein incorporated by reference in its entirety.

BACKGROUND OF THE INVENTION

1. Field of the Invention

The present invention relates to a vehicle door with a door beam and particularly to a vehicle door with vibration damping.

2. Description of the Related Art

A reinforced door for a vehicle is known. Such a door is reinforced to bear an impact applied to the door in a lateral direction by adding a door beam between an outer panel and an inner panel of the door. Further, the door beam may be processed to be coated with a sealer such as mastic sealer for connection of the outer panel to the door beam through the sealer. This door beam can increase a stiffness of the door and reduce a sound level in closing the door.

JP 2006-315497A discloses, at paragraph 0047 and in FIG. 28, a door with a noise suppressing member made of a metal plate which is fixed to an outer circumference of the door beam in which an end of the noise suppressing member is connected to the outer panel through a viscoelastic layer.

SUMMARY OF THE INVENTION

A first aspect of the present invention provides a door for a vehicle comprising: an inner panel; an outer panel, fixed to the inner panel, disposed outside the inner panel with respect to the vehicle; a door beam between the inner panel and the outer panel, the door beam being fixed to the inner panel; a vibration damping member; and a bracket fixed to the door beam, extending from the door beam toward the outer panel and including at an end thereof a curved part protruding toward the outer panel. The bracket is connected at the end to the outer panel through the vibration damping member.

According to the first aspect, the door beam can be connected to the outer panel through the vibration damping member at a connection part of the bracket.

A second aspect of the present invention provides the door based on the first aspect, wherein the bracket includes an elongated hole of which opening extends from a side of the door beam toward the outer panel.

According to the second aspect, the elongated hole allows the bracket to be fixed to the door beam at different fixing angles. Thus, if an assembling jig is used in a manufacturing process, the elongated hole can facilitate the manufacturing process. More specifically, the same assembling jig can be used among a plurality types of outer panels having different distances between the outer panel and the door beam by adjusting a fixing angle of the bracket on the door beam. The elongated hole allows the bracket to be fixed to the door beam at different fixing angles.

A third aspect of the present invention provides the door based on the first aspect, wherein the bracket has a circular ring shape on a cross section thereof.

According to the third aspect, the bracket can be fixed at any fixing angle on the cross section of the door beam.

A fourth aspect of the present invention provides the door based on the first aspect, wherein the bracket has a first length in a longitudinal direction of the door beam at the end and a second length at an opposite end connected to the door beam in the longitudinal direction, and the second length is greater than the first length.

According to the fourth aspect, the bracket can be welded on the door beam easier.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the above-mentioned related art will be further explained.

In consideration of increase in crash worthiness and examination in VA (Value Analysis), it is preferable to provide the door beam diagonally to the door. However, under a circumstance that the outer panel is provided with complicated curvatures as the exterior design of the door becomes diversified, in such a door, it becomes difficult in connecting the door beam to the outer panel through the sealer (vibration damping member). This is because a distance between the door beam and the outer panel cannot be kept constant between an end and the middle of the door beam having a considerable length.

According to this technique, the damping member should be designed in form for each type of vehicle because the distance between the door beam and the outer panel depends on the type of the vehicle and an error made in assembling. Further, this technique requires severe dimensional control in consideration of the error in assembling.

The present invention provides a vehicle door with a door beam which can be assembled to the outer panel without influence on the form of the outer panel.

With reference to drawings an embodiment will be described in detail.

Figure 1:
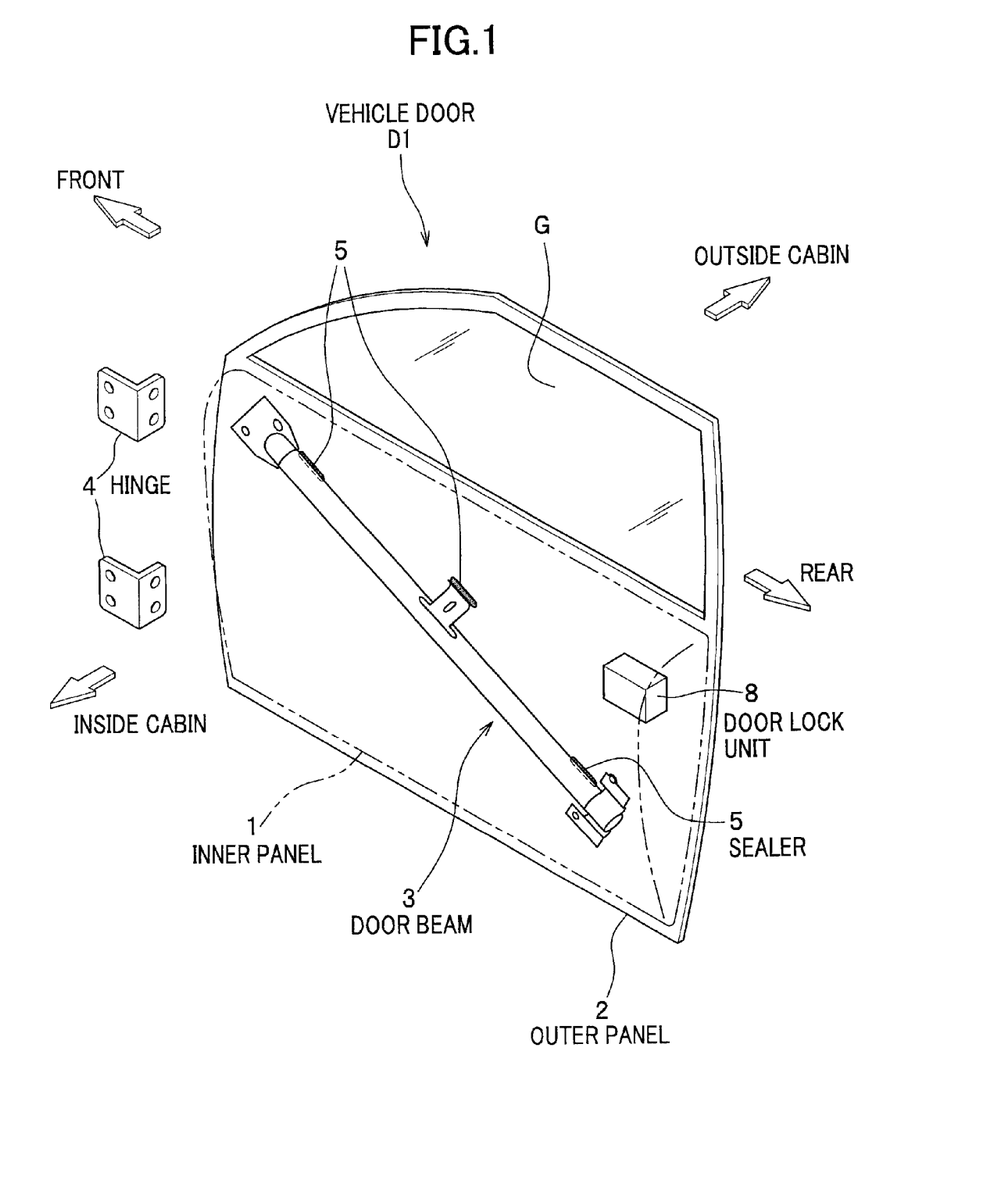
FIG. 1 shows a perspective view of a door to illustrate an arrangement of a door beam and members for damping according to a first embodiment of the present invention.
Figure 2:
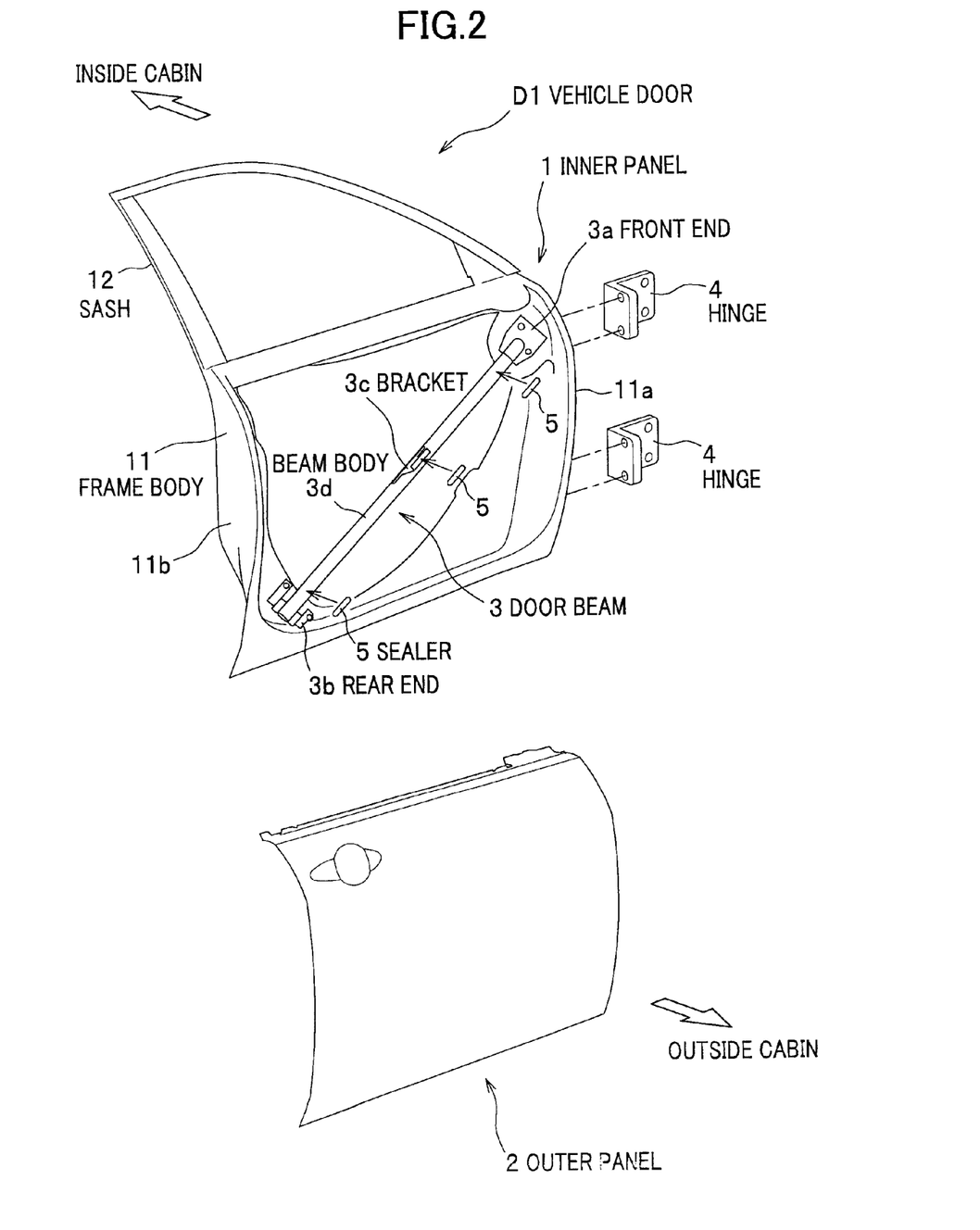
FIG. 2 is an exploded view for illustrating the door according to the first embodiment of the present invention.
Figure 3:
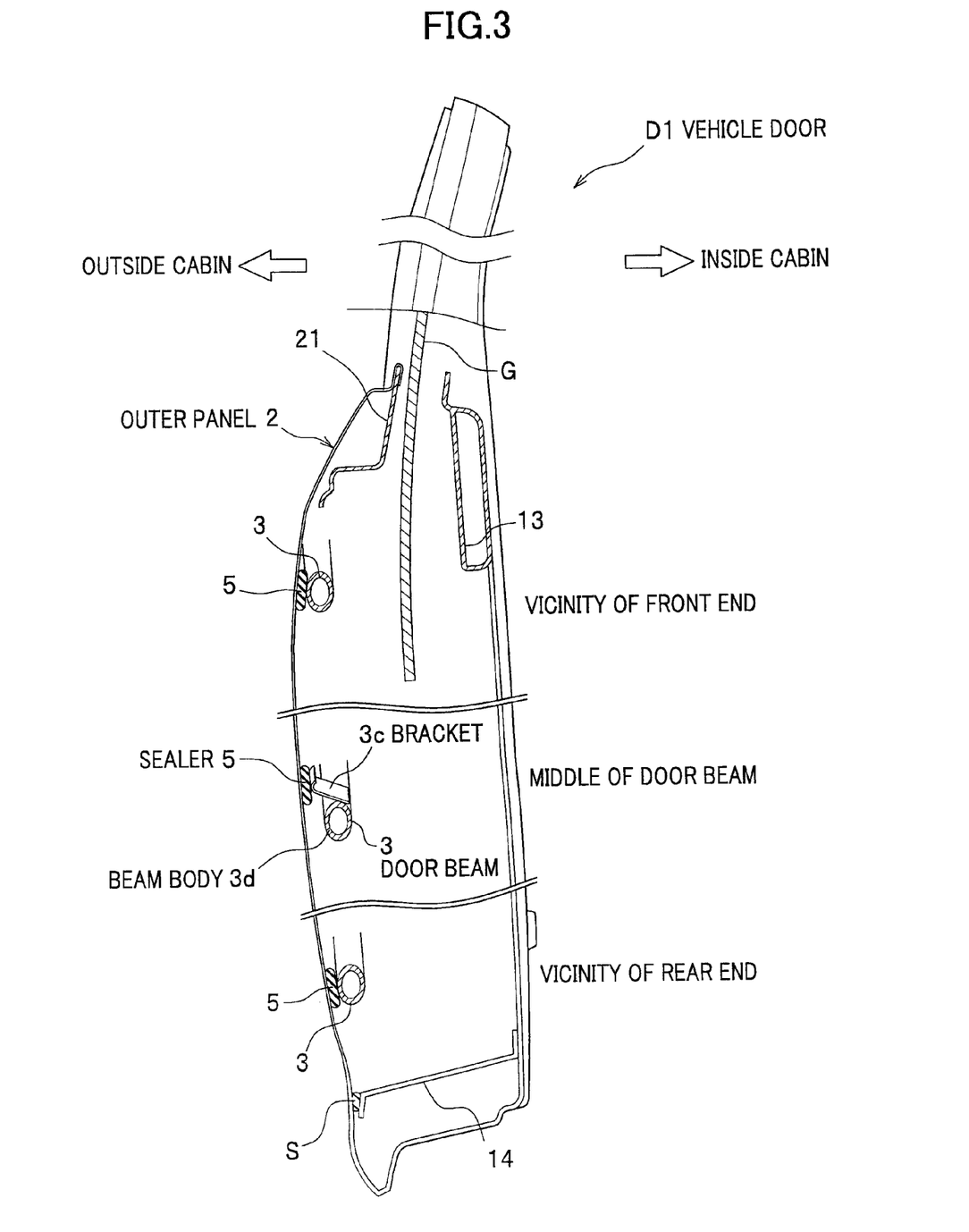
FIG. 3 is a sectional view showing cross sections of the door at a front end, a middle, and a rear end of the door beam which is diagonally fixed to the outer panel to illustrate distances between the outer panel and the door beam in one figure.

FIG. 1 shows a perspective view of a door to illustrate an arrangement of a door beam and members for damping according to a first embodiment of the present invention. FIG. 2 is an exploded view for illustrating the door according to the first embodiment of the present invention. FIG. 3 shows cross sections of the door at a front end, middle, and a rear end of the door beam which is diagonally fixed to the outer panel to illustrate different distances between the outer panel and the door beam in one figure.

In the embodiment and the drawings of the present invention, "front" indicates a front side of the vehicle; "rear", a rear side of the vehicle; "up", a vertical upper side; and "low", a vertical lower side. Further, generally, "inside" or "interior" means a side of the cabin of the vehicle, and generally, "outside" or "exterior" means outside from the cabin of the vehicle otherwise specified. Further, "inside of the door" is defined as "inside the cabin of the vehicle".

As shown in FIGS. 1 to 3, a vehicle door D1 of a hinge type is arranged, for example, on a right side of a front seat on the vehicle. Hereinafter, a hinge and rear-open type of the vehicle door D1 arranged on the right side of the front seat is exemplified.

The vehicle door D1 mainly includes an inner panel 1 as a substructure of the vehicle door D1, the outer panel 2 fixed on an outside (regarding the cabin of the vehicle) of the inner panel 1, a door beam 3 fixed to the inner panel 1, hinges 4 for pivotably supporting the vehicle door D1 relatively to the body of the vehicle, and a door lock unit 8 for holding the vehicle door D1 in a closing state. The door beam 3 is connected to the outer panel 2 through a sealer (vibration damping member) 5.

Further, the vehicle door D1 is provided with a lining (not shown) arranged on an interior side of the inner panel 1, a window unit (not shown) for ascending and descending a window glass G, an inside handle (not shown) and an outside handle (not shown), electric devices (not shown) for the window unit and the like, and rubber frames (not shown) arranged around the frame of the vehicle door D1. In addition, the vehicle door D1 may be a so-called hybrid door including an inner panel 1 made of steel and an outer panel 2 made of light metal such as an aluminum alloy and a magnesium alloy.

As shown in FIG. 2, the inner panel 1 is a frame member of the vehicle door D1 formed in a substantially rectangle shape. The inner panel 1 on a front side face (one end side face) 11a thereof is pivotably connected by the upper and lower hinges 4 to the body of the vehicle, and the rear part (the other end side face) 11b has the door lock unit 8 (see FIG. 1) to hold the door closing state. The inner panel 1 is formed of a metal such as steel. The inner panel 1 includes: a frame body 11 of which exterior side is connected to a front end 3a of the door beam 3 and further a sash 12 for supporting the window glass G (see FIG. 1), an upper inner frame 13 extending in the front-rear direction, and an under frame 14, which are welded on the frame body 11.

As shown in FIG. 2, the outer panel 2 is fixed to the frame body 11 by welding and a hemming process to uppermost edges of the frame body 11 and a lowermost edge the frame body 11.

To an upper part of the front side face 11a of the frame body 11 are fixed an upper hinge 4 arranged outside the cabin and a front end 3a of the door beam 3 with a common fastening member such as a bolt (not shown). The front side face 11a at an uppermost part thereof is connected to a front part of the sash 12 by welding.

To a lower part of the front side face 11a of the frame body 11 is fixed a lower hinge 4 arranged outside the cabin with a common fastening member such as a bolt (not shown).

The front end 3a of the door beam 3 is fixed to the upper inner part of the front side face 11a of the frame body 11 with fixing members (not shown). The rear end 3b of the door beam 3 is fixed to an inner lower part of the rear side face 11b of the frame body 11 with fixing members (not shown). Further, the rear side face 11b is provided with the door lock unit 8 (see FIG. 1). Further, the door beam 3 is connected to the outer panel 2 through the sealer 5 in the vicinity of the front end 3a and the rear end 3b.

The sash 12 is a window frame for the window glass G (see FIG. 1) in which the front part and a rear part on a lower side thereof are connected to an upper front end and an upper rear end of the frame body 11 by welding, respectively. The sash 12 and the frame body 11 may be integrally molded. In addition, the sash 12 may be omitted like a hard top type of motor vehicle.

The outer panel 2 is made of a rolled plate of a light metal such as an aluminum alloy and a magnesium alloy by pressing. The outer panel 2 is fixed to a periphery of the frame body 11 of the inner panel 1 both by the hemming process and a welding process (in a case of the light metal alloy plate, a structural adhesive S (see FIG. 3) is used).

In addition, an upper outer frame 21 (see FIG. 3) is arranged at an upper end of the outer panel 2 and fixed thereto for reinforcement. During a process of connecting the outer panel 2 to the inner panel 1, a lower frame 14 (see FIG. 3) is fixed to a lower end of the outer panel 2 with a structural member adhesive S and rivets (not shown).

As shown in FIG. 2, the front end 3a which is an end of the beam body 3d made of a long member is fixed to an upper part inside the front side face 11a of the frame body 11 with a fastening member (not shown) such as a rivet and at a rear end 3b of the beam body 3d to a lower part inside the rear side face 11b with a fastening member (not shown) such as a rivet. Accordingly, the door beam 3 is approximately diagonally fixed to the frame body 11 along a diagonal line of the frame body 11 having a substantially rectangular shape. In the vicinity of the front end 3a of the door beam 3 and the vicinity of the rear end 3b, a sealer is coated on the door beam 3 and the door beam 3 is connected to an inner surface of the outer panel 2 through the sealer 5.

However, the outer panel 2 may be curved as shown in FIG. 3 for a reason of design such that the outer panel 2 successively protrudes outwardly in going from an upper part to the lower part thereof. In the vehicle door D1 having such the outer panel, as shown in FIG. 2, when the door beam 3 is diagonally fixed to the frame body 11 along the diagonal line, a distance between the door beam 3 and the outer panel 2 varies, as shown in FIG. 3, from the vicinity of front end 3a (see FIG. 2), via a middle part, to the vicinity of the rear end 3b (see FIG. 2).

FIG. 3 shows cross sections of the door at the front end, the middle part, and the rear end of the door beam which is diagonally fixed to the inner panel 1 to illustrate the distance varying between the outer panel 2 and the door beam 3 in one figure, in which a middle cross section shows the middle part of the door beam 3.

As shown in FIG. 3, in a case of the outer panel 2 outwardly curved, the door beam 3 can be connected to the outer panel 2 through the sealer 5 in the vicinity of the front end 3a and the vicinity of the rear end 3b (see FIG. 2), but the middle part of the door beam 3 cannot be connect via the sealer 5 because the distance at the middle part between the door beam 3 and the outer panel 2 is larger than the other parts.

As mentioned above, connecting the door beam 3 to the outer panel 2 through the sealer 5 suppresses vibrations of the outer panel 2 and the door beam 3 to provide an anti-vibration effect. Thus, connecting the vicinity of the front end 3a of the door beam 3 and the vicinity of the rear end 3b of the door beam 3 to the outer panel 2 can provide the anti-vibration effect. However, to obtain the anti-vibration effect more efficiently, it is preferable to connect the door beam 3 to the outer panel 2 at the middle part of the door beam 3 in addition to the vicinity of the front end 3a and the rear end 3b.

Then, a bracket 3c is fixed to the door beam 3 and connected to a surface of the outer panel 2 on the side of the cabin through the sealer 5 as shown in FIGS. 2 and 3. Accordingly, connecting the bracket 3c at the middle part of the door beam 3 to the outer panel 2 through the sealer 5 efficiently suppresses the vibrations of the outer panel 2 and the door beam 3 and provides an efficient anti-vibration effect.

The sealer 5 serves as a vibration damping member for absorbing an impact, vibrations, and closing sounds in closing the vehicle door D1 and suppressing vibrations of the vehicle door D1 during traveling. The sealer 5 comprises, for example, a mastic sealer having an adhesion, which is elastically deformable for allowing a relative displacement between the outer panel 2 and the bracket 3c. As shown in FIGS. 2 and 3, the sealer 5 intervenes between the door beam 3 and the outer panel 2 after the door beam 3 is assembled into the vehicle door D1 and is adhered to a surface of the door beam 3 which is outside with respect to the cabin (vehicle) and the surface (rear surface) of the outer panel 2 which is inside with respect to the cabin (vehicle). The mastic sealer (also referred to as mastic adhesive) is a sealer with elasticity used both as an adhesive and a vibration damping member and comprises, for example, epoxy resin.

Thus, the sealer 5 serves as a vibration damping means for suppressing the vibration of the vehicle door D1.

The bracket 3c in this embodiment is fixed to a middle part of the vehicle door D1 as shown in FIG. 2. However, the position is not limited to this position, but may be shifted toward the front end 3a of the door beam 3 or toward the rear end 3b.

Figure 4A:
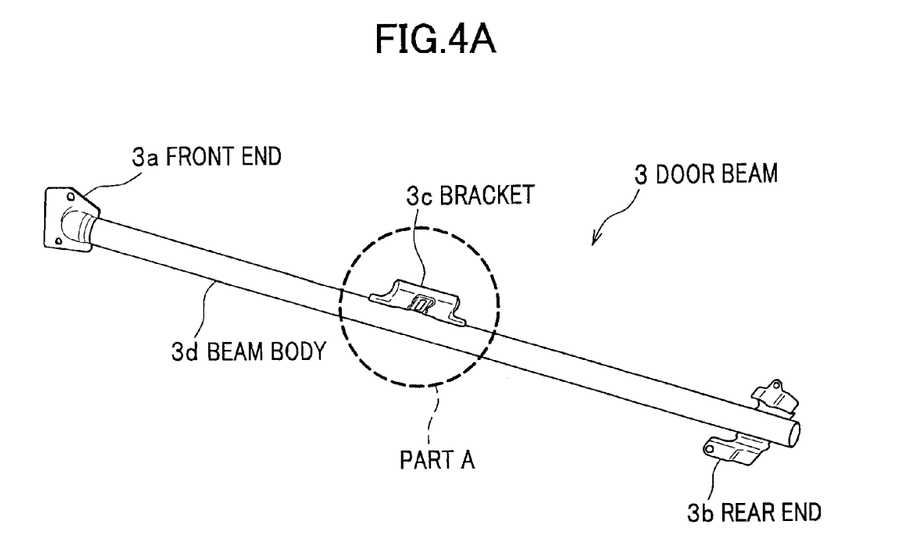
FIG. 4A is a perspective view of a door beam according to the first embodiment.
Figure 4B:
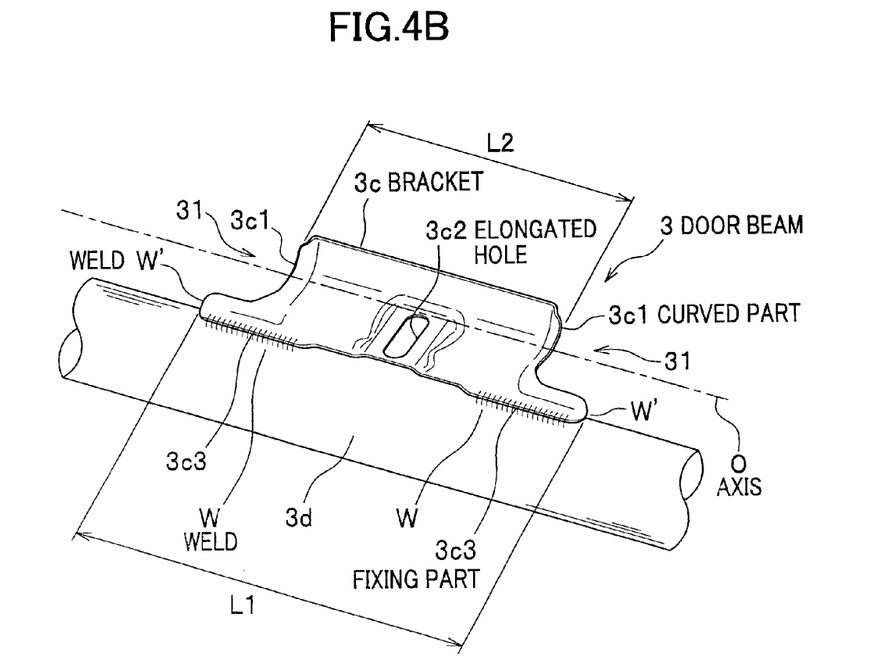
FIG. 4B is an enlarged view of a part A shown in FIG. 4A.

FIG. 4A shows the door beam 3 according to the embodiment, and FIG. 4B shows an enlarged view of a part A in FIG. 4A. As shown in FIG. 4A, to form the door beam 3 according to the embodiment, the front end 3a is formed at one end of the beam body 3d which is long and has a circular ring shape on a cross section thereof, and the rear end 3b is formed at the other end of the beam body 3d. The front end 3a and the rear end 3b comprising, for example, planar members are fixed to the ends of the beam body 3d to form the door beam 3. The planner members have through holes for fixing the planer members to the inner panel 1 (see FIG. 1) with fixing members such as rivets.

Shapes of the front end 3a and the rear end 3b are not limited to those shown in FIG. 4A, but may be changed in accordance with a shape of the vehicle to which the door beam 3 is fixed.

The bracket 3c is disposed at the middle of the door beam 3. As shown in FIG. 4B, the bracket 3c comprises a planar member. At one end of the planer member, a fixing part 3c3 is provided to fix the bracket 3c to the beam body 3d, and a curved part (connecting part) 3c1 is formed at the other end of the planer member opposite to the fixing part 3c3.

The bracket 3c having such a structure is fixed to an outer circumference face of the beam body 3, in which a planer plane of the bracket 3c is made parallel to a longitudinal direction of the beam body 3d by forming welds W at a right face (shown in FIG. 4B) of the fixing part 3c3.

It is preferable to weld the fixing parts 3c3 of the bracket 3c with forming welds W' at a wrong face of the fixing parts 3c3 to have a larger fixing strength.

To facilitate welding, a length L1 of the fixing parts 3c in a longitudinal direction of the beam body 3d is made longer than a length L2 of the curved part 3c1 in the longitudinal direction of the beam body 3d. This provides access spaces 31 for welding the wrong faces of the fixing parts 3c3 to the beam body 3d with a total length in the longitudinal direction of the door beam 3 defined by a difference between L1 and L2. More specifically, on the wrong face of the bracket 3c, during welding, the bracket 3c is in contact with the surface of the beam body 3d with an acute angle between the bracket 3c and a tangential direction of the bracket body 3d. Thus, the access spaces 31 facilitate access to the parts to be welded to form the welds W'.

At an end of the bracket 3 opposite to the fixing parts 3c3, is formed the curved part 3c1 extending from the side of the beam body 3d (upper direction in FIG. 4B) to protrude the wrong face of the bracket 3. As mentioned above, the curved part 3c1 is formed which is curved around an axis O in parallel to the beam body 3d. In addition, the curved part 3c1 is formed such that the bracket 3 is in contact with the outer panel 2 on the side of the protruding side (wrong face of the bracket 3) when the door beam 3 is fixed and assembled in the vehicle door D1.

FIG. 4B shows the curved part 3c1 which is curved as going in an opposite direction to the beam body 3d (upward direction in FIG. 4B). However, the curved part 3c1 may be formed on the side of beam body 3d, the curved part 3c1 being curved as going in a downward direction of FIG. 4B.

Figure 5:
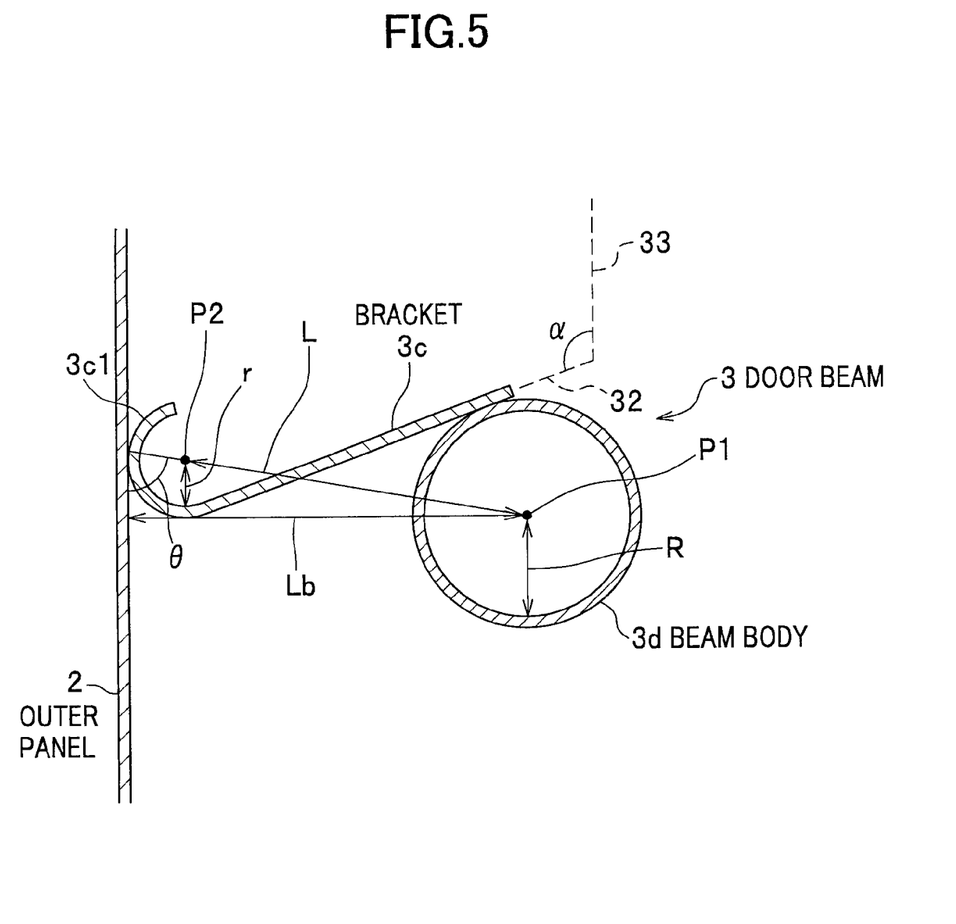
FIG. 5 is a sectional view of a beam body and a bracket.

Will be described an operation of the curved part 3c1 which is provided to the bracket 3c. FIG. 5 shows a cross section of the beam body 3d and the bracket 3c in which the cross section is made on a plane orthogonal to an axis of the door beam 3. In FIG. 5, it is assumed that a radius of the beam 3d on the cross section is R, and the curved part 3c1 is an arc which is a part of a circle having a radius r with a center P2. Further, it is assumed that a distance on the cross section between a center P1 of the beam body 3d and the center P2 is L.

The outer panel 2 is made in contact with the curved part 3c1 so as to make an angle θ (hereinafter referred to as a contact angle) between a surface of the outer panel 2 and a line between the center P1 of the beam body 3d and the center P2 of the curved part 3c1. In other words, the curved part 3c1 is in contact with the outer panel 2 with the contact angle θ.

In FIG. 5, the sealer 5 (see FIG. 1) intervening between the bracket 3c and the outer panel 2 is omitted.

In this condition, the distance Lb between the center P1 of the beam body 3d and the outer panel 2 is approximated by:

$$Lb = L \sin \theta + r \quad (1)$$

As shown in Eq. (1), because the distance Lb between the center P1 and the outer panel 2 can be represented in a linear function of sin θ, the distance Lb continuously varies with variation of the contact angle θ from L+r (when the contact angle θ=90°) to R (when an outer circumference of the beam body 3d is in contact with the outer panel).

This indicates that although the distance Lb varies, it is possible for the bracket 3 to contact the outer panel 2 by change of the contact angle θ. More specifically, when the distance Lb is large, the contact is given by making the contact angle θ large with the bracket 3c being fixed at a position where the bracket 3c reaches through counterclockwise rotation around the center P1 in FIG. 5. Further, when the distance Lb is small, the contact is given by making the contact angle θ small with the bracket 3c being fixed at a position where the bracket 3c reaches through clockwise rotation around the center P1 in FIG. 5.

In this embodiment, because the door beam 3 is formed with the beam body 3d having the circular ring shape on a cross section thereof, the bracket 3c can be fixed after rotation around the center P1. Thus, combining the beam body 3d having the circle ring shape on the cross section and the bracket 3c having the curved part 3c1 provides the operation mentioned above. However, the cross-sectional shape of the beam body 3d is not limited to this, but may be an oval.

As shown in FIGS. 2 and 3, in the vehicle door D1, a clearance (approximately 6 mm) between the curved part 3c1 and the outer panel 2 is provided to coat the sealer 5. Actually, a thickness of the bracket 3c is considered to suppress vibrations.

The curved part 3c1 of the bracket 3c is connected to the outer panel 2 through the sealer 5. In other words, the bracket 3c is connected to the outer panel 2 through a vibration damping member for suppressing vibrations.

In this embodiment as shown in FIG. 5, the curved part 3c1 of the bracket 3c is formed as an arc. However, being not limited to this, the curved part 3c1 may be a part of an oval or a parabola.

In the bracket 3c for the door beam 3 according to the embodiment, as shown in FIG. 4, an elongated hole (through hole) is formed of which opening (side edges of holes) extends from the side of the fixing part 3c3 toward the curved part 3c1.

The elongated hole 3c2 is a reference hole used in assembling the door beam 3 serving as a reference for a fixing position of the bracket 3c on the beam body 3d with respect to the longitudinal direction of the beam body 3d.

The door beam 3 is assembled by welding the bracket 3c to the beam body 3d (see FIG. 4A). However, to position the bracket 3c on the beam body 3d, an assembling jig 10 may be used for assembling the door beam 3.

Figure 6A:
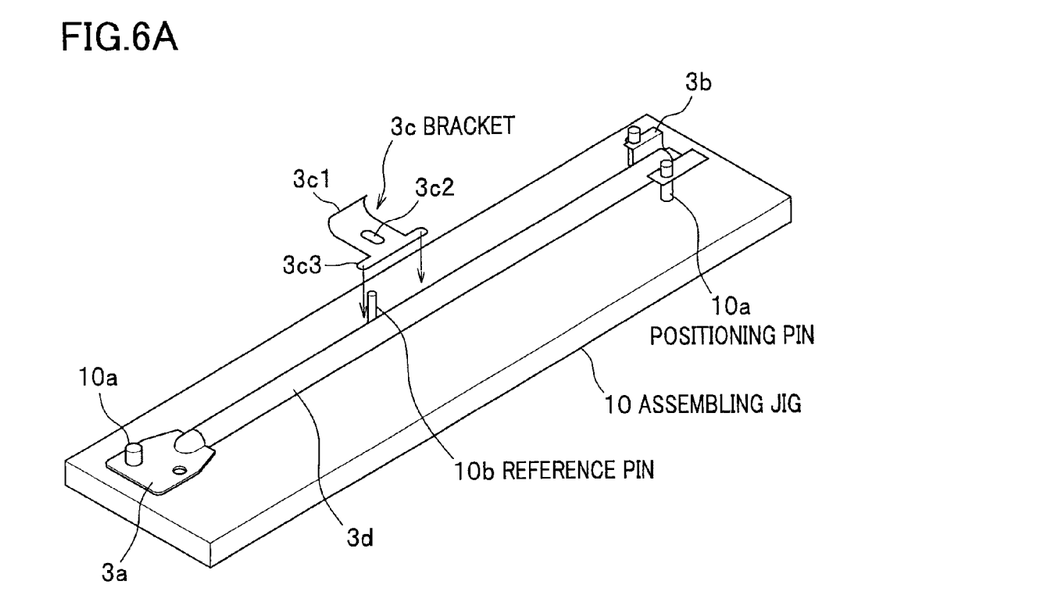
FIG. 6A is a perspective view of an example of an assembling jig having a reference pin.

FIG. 6A shows an example of such a jig. As shown in FIG. 6A, a reference pin 10b is fixed to a base of the assembling jig 10 so as to vertically extend from the base.

The beam body 3d is placed on the base of the assembling jig 10 with positions of both ends being controlled. The bracket 3c is fixed to the beam body 3d with the reference pin 10b penetrating the elongated hole 3c2. The opening of the elongated hole 3c2 extends from the side of the fixing part 3c3 toward the side of the curved part 3c1 and has a width approximately equal to (slightly smaller than) a diameter of the pin 10b. The elongated hole 3c2, being formed as mentioned above, can dispose the bracket 3c at a fixing position on the beam body 3d in the longitudinal direction of the beam body 3d. In other words, the bracket 3c can be fixed to a predetermined position of the beam body 3d.

The method of controlling the positions of the both ends of the beam body 3d is not limited to this. For example, a positioning pin 10a for being fitted in a hole for fixing the door beam 3 to the vehicle door D1 may be provided in the assembling jig 10.

As mentioned earlier, it is necessary to fix the bracket 3c to a position where the beam body 3d reaches after rotation of the beam body 3d around the center P1 on the cross section as shown in FIG. 5 in accordance with the distance Lb between the center P1 and the outer panel 2 on the cross section of the beam body 3d. In other words, a fixing angle of the bracket 3c about the center P1 varies with a dimension of the curvature of the outer panel 2.

This is attributable to that the hole 3c2 which allows the reference pin 10b shown in FIG. 6A to penetrate therethrough is elongated.

Figure 6B:
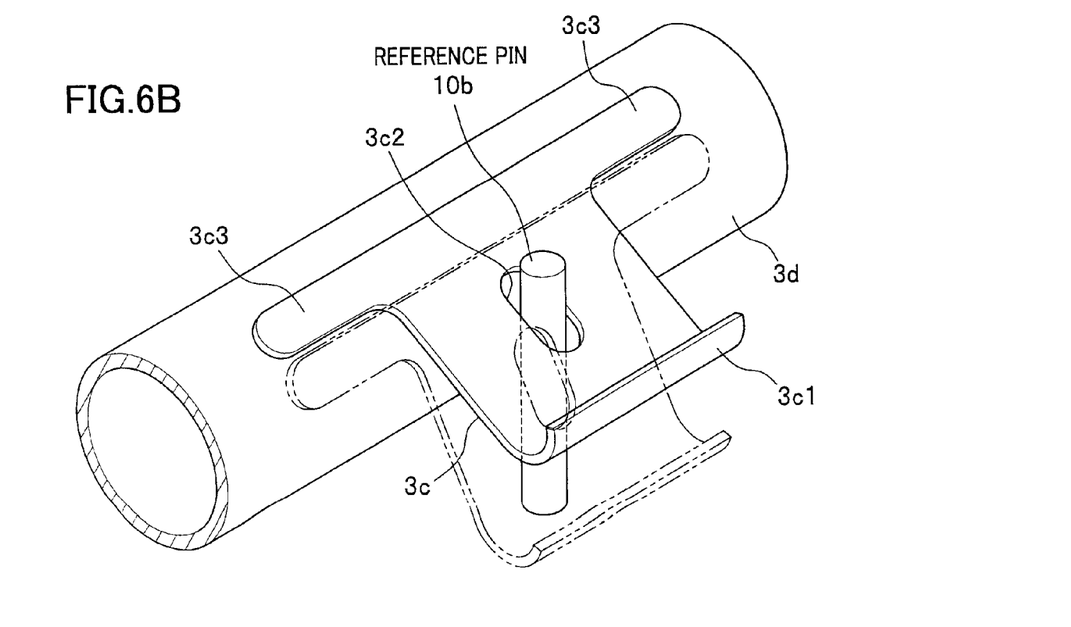
FIG. 6B is an enlarged perspective view of an assembling process in which the reference pin penetrates an elongated hole in a bracket.

FIG. 6B shows a condition where the reference pin 10b penetrates the elongated hole 3c2. As shown in FIG. 6B, the elongated hole 3c2 which the reference pin 10b penetrates provides clearances therein in a longitudinal direction of the elongated hole 3c2. The clearances allows bracket 3c to rotate around the center P1 with the reference pin 10b freely penetrating the elongated hole 3c2.

Thus, the elongated hole 3c2 through which the reference pin 10b penetrates allows the bracket 3c to be disposed at any fixing angle about the center on the cross section of the beam body 3d with the same assembling jig 10. In other words, it is unnecessary to prepare any special jig for each door beam 3 having a different fixing angle. This reduces a manufacturing cost.

As shown in FIG. 3, when the door beam 3 is fixed to the outer panel outwardly curved, the distance between the door beam 3 and the outer panel 2 at the middle of the outer panel 2 is greater than those at other locations. Accordingly to connect a middle of the door beam 3 to the outer panel 2, it is necessary for the door beam 3 to be provided with the bracket 3c. Here, the curvature of the outer panel 2 varies from one type of vehicle to another type of vehicle. Thus, generally it is necessary to prepare brackets having different dimensions in accordance with types of vehicles.

However, although the curvature of the outer panel 2 varies for each type of vehicles, the bracket 3c for the door beam 3 according to the embodiment can contact the outer panel 2 by adjusting the contact angle θ between the outer panel 2 and the curved part 3c1 (see FIG. 5). This eliminates the necessity of designing the bracket 3c for each type of vehicles with advantageous effect that a manufacturing cost is reduced.

Further, among the vehicle doors D1 for one type of vehicles, if there is an error in designing and manufacturing parts, the contact between the outer panel 2 and the bracket 3c can be adjusted by controlling the contact angle θ, so that an accuracy required in manufacturing can be moderated, which reduces the manufacturing cost.

As mentioned above, the bracket 3c includes welds W and W' on both surfaces thereof and the bracket includes the access space (access spaces) 31 having a length defined by a difference between the first and second lengths.

Further, the bracket 3c extends from the door beam 3 toward the outer panel 2 in an extending direction with a predetermined length. The bracket 3c is fixed to the inner panel at a fixing angle α between the extending direction 32 of the bracket 3c and a reference plane 33 defined by fixing the door beam 3 to the inner panel 1 (for example, a face of the front end 3a fixed to the inner panel 1). The fixing angle α is determined on the basis of a distance Lb between the door beam 3 and the outer panel 2.

In addition, the bracket 3 is fixed to an approximately middle of the door beam to connect the door beam 3 to the outer panel 2 through the bracket 3c and the vibration damping member 5, and a part of the door beam 3 near the front end 3a or the rear end 3b is fixed to another vibration damping member 5 which is fixed to the outer panel 2.

The invention claimed is:

1. A door for a vehicle and a jig temporarily used to position a bracket with reference to a beam body of the door, the door comprising:

an inner panel;

an outer panel, fixed to the inner panel, disposed outside the inner panel with respect to the vehicle;

a door beam between the inner panel and the outer panel, the door beam being fixed to the inner panel, the door beam comprising the beam body having a front end at one end and a rear end at the other end, and a circular ring shape on a cross section thereof;

a vibration damping member; and the bracket, which is fixable to the door beam and extends from the door beam toward the outer panel, said bracket including:

a bracket fixing part configured to fix the bracket to the beam body at one end of the bracket;

a connecting part at the other end of the bracket opposite to the fixing part protruding toward the outer panel, the connecting part having an arc that is a part of a circle on cross section thereof, the circle having a center and the connecting part extending along an axis on the center in parallel to an axis of the door beam; and an elongated hole therein, having an opening extending from a side of the door beam toward the outer panel, configured to determine a position of the bracket relative to the beam body in a longitudinal direction of the beam body wherein the bracket is connectable at the connecting part to the outer panel through the vibration damping member;

wherein the elongated hole allows a reference pin of the jig to penetrate therethrough to determine the position of the bracket relative to the beam body in the longitudinal direction of the beam body with clearances between the elongated hole and the reference pin in a longitudinal direction of the elongated hole, the jig comprising a base configured to allow the beam body to be placed thereon, a positioning pin configured to control at least one of positions of the front end and the rear end while the beam body is placed on the base to fix the bracket to the beam body, and the reference pin.

2. The door as claimed in claim 1, wherein the bracket has a first length in the longitudinal direction of the door beam at the one end and a second length at the other end in the longitudinal direction, and the first length is greater than the second length.

3. The door as claimed in claim 1, wherein the bracket extends from the door beam toward the outer panel in an extending direction with a predetermined width, the bracket is fixed to the inner panel at a fixing angle between the extending direction and a reference plane defined by fixing the door beam to the inner panel, and the fixing angle is determined on the basis of a distance between the door beam and the outer panel.

4. The door as claimed in claim 1, wherein the bracket is fixed to an approximately middle of the door beam to connect the door beam to the outer panel through the bracket and the vibration damping member, and a part of the door beam near a front end or a rear end is fixed to another vibration damping member which is fixed to the outer panel.

5. The door as claimed in claim 1, wherein the bracket has a first length in the longitudinal direction of the door beam at the one end and a second length at the other end in the longitudinal direction, and the first length is greater than the second length.

6. The door as claimed in claim 1, wherein the bracket extends from the door beam toward the outer panel in an extending direction with a predetermined width, the bracket is fixed to the inner panel at a fixing angle between the extending direction and a reference plane defined by fixing the door beam to the inner panel, and the fixing angle is determined on the basis of a distance between the door beam and the outer panel.

7. The door as claimed in claim 1, wherein the bracket is fixed to an approximately middle of the door beam to connect the door beam to the outer panel through the bracket and the vibration damping member, and a part of the door beam near a front end or a rear end is fixed to another vibration damping member which is fixed to the outer panel.

8. The door as claimed in claim 1, wherein a portion of the beam body to which the bracket is affixed is spaced a distance from the vibration damping member and the outer panel.

* * * * *